Figure 1:
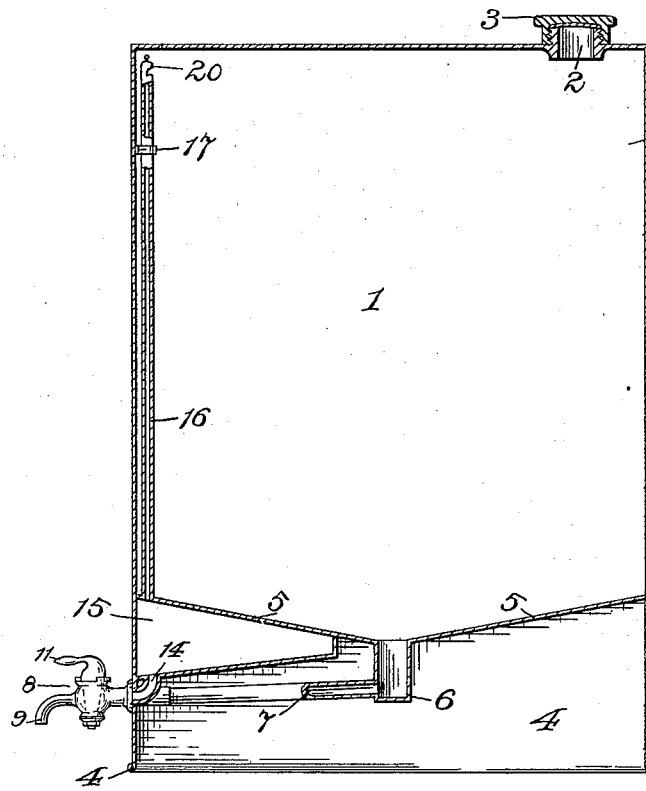

No. 664,349. Patented Dec. 18, 1900.
A. S. COLLINS.
AUTOMATIC MEASURING DEVICE.
(Application filed May 9, 1900.)

(No Model.) 2 Sheets—Sheet 1.

WITNESSES:
Walter E. Haas.
A. W. Riche.

INVENTOR:
Alva S. Collins,
BY
Frank M. Burnham
His ATTORNEY.

No. 664,349. Patented Dec. 18, 1900.
A. S. COLLINS.
AUTOMATIC MEASURING DEVICE.
(Application filed May 9, 1900.)
(No Model.) 2 Sheets—Sheet 2.

WITNESSES:
Walter E Haas.
I. W. Riche.

INVENTOR:
Alva S. Collins,
BY
Frank M Burnham
HIS ATTORNEY.

UNITED STATES PATENT OFFICE.

ALVA SYLVESTER COLLINS, OF TROY, OHIO, ASSIGNOR TO L. A. COPPOCK, C. N. PETERS, AND A. M. COLLINS.

AUTOMATIC MEASURING DEVICE.

SPECIFICATION forming part of Letters Patent No. 664,349, dated December 18, 1900.

Application filed May 9, 1900. Serial No. 16,044. (No model.)

*To all whom it may concern:*

Be it known that I, ALVA SYLVESTER COLLINS, a citizen of the United States, residing at Troy, in the county of Miami and State of Ohio, have invented certain new and useful Improvements in Automatic Measuring Devices for Liquids; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an automatic measuring device for liquids or, otherwise expressed, means for automatically measuring and handling liquids of any kind, and is designed more especially for coal-oil or other oils, but particularly gasolene or any liquids of a similar nature which readily and quickly evaporate and are therefore necessary to be kept in an air-tight reservoir or receptacle; and it has for its objects the providing of a device of the nature above referred to by which a larger or smaller amount of liquid, as desired, may be stored and automatically measured off in a greater or smaller predetermined amount, as desired, when drawn by simply operating the handle of the faucet, and, further, in providing a device of this kind of simple construction and at a small cost of manufacture; and it consists, first, in the peculiar form and construction of the faucet, (used in connection with a receptacle or reservoir containing liquids, of which it forms an integral part,) so that when the contents of a smaller receptacle or measure containing a designated amount of liquid has been drawn off the construction of said faucet being such as to permit of the automatic refilling of said smaller receptacle or measure from said larger or supply receptacle or reservoir, and, second, my invention further consists in the construction of the receptacle or reservoir portion of my automatic measuring device, which consists, preferably, in providing a supply can or reservoir of any desired capacity and shape with a removable air-tight cap or plug located in its top for the reception of the oil or other liquids and having its bottom preferably conically-shaped, at the apex to which is connected the supply-pipe which conducts the oil or fluid to the faucet, through which it is admitted to the smaller receptacle or measure, which is adapted for a specified or designated capacity, said smaller or measuring receptacle being connected to the supply receptacle or reservoir, of which it forms an integral part, and may consist of one or more in number, each having a capacity of one or more quarts, and in the instance here shown and described for the purpose of illustrating the principles of my invention consists of a four-quart measure, a two-quart measure, and a one-quart measure, each measure being provided with an air or vent tube which extends on the inside of and to within a short distance of the top of the supply can or receptacle, thus acting as a vent for the smaller as well as the larger receptacle, thereby permitting of the free and uninterrupted flow of the fluid from both.

The faucet is constructed so that when turned in a position for drawing off connection is established between the spout and the smaller receptacle or measure, and when turned in an off or closed position connection is established between both the larger and smaller receptacles.

My invention will be more fully described hereinafter, and pointed out in the subjoined claims, in accordance with the statutes in such cases made and provided therefor.

Figure 2:
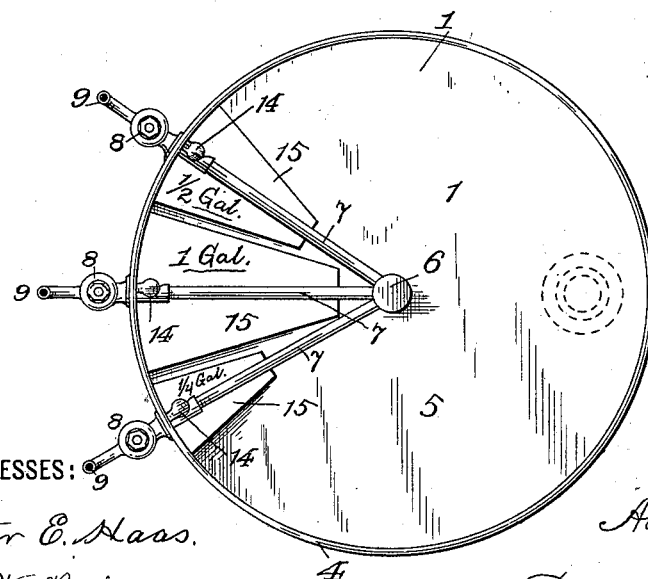
Figure 3:
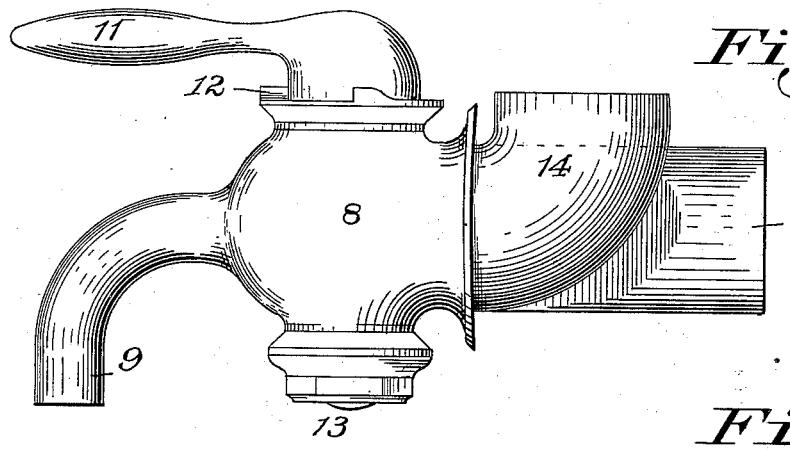
Figure 4:
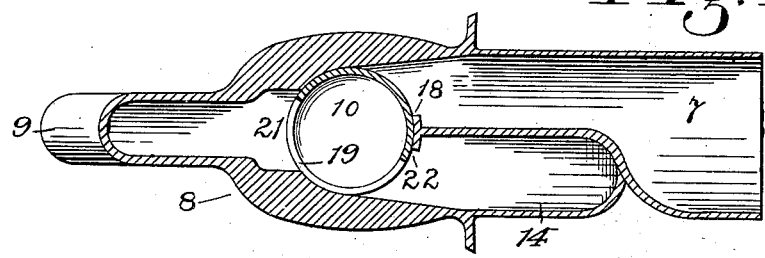

Referring to the accompanying drawings, illustrating my invention and in which corresponding numerals of reference refer to like parts throughout the several views, Figure 1 is a vertical sectional view of my automatic measuring device, and Fig. 2 is a bottom plan view of the same. Fig. 3 is a view, on an enlarged scale, showing the faucet portion of my invention in side elevation. Fig. 4 is a central longitudinal sectional view, on an enlarged scale, of said faucet portion with the key turned in position so as to close all communications with the supply-receptacle, but so that its port will aline with and establish an open communication from the measure to the spout; and Fig. 5 is a central longitudinal sectional view, on an enlarged scale, of said faucet portion with the key turned in position so as to close all communication with the spout, but so that its port will aline with and open communication from the supply-receptacle to the measuring-receptacle; and Fig. 6 is a detail view in perspective of the key which operates the faucet portion.

Referring in detail to the different parts of my invention as shown in the accompanying drawings by means of the aforesaid numerals of reference, 1 is the supplying receptacle or reservoir, provided with an opening 2, through which the oil or other fluids are introduced therein, said opening being provided with a collar adapted to receive a removable cap or plug 3, so constructed that when in position it will hermetically seal said supply-receptacle and make it air-tight, thus preventing the evaporation of its contents.

Located at a suitable distance above the base 4, so as to form a false bottom, and thus raise the faucet high enough to facilitate the drawing off of the liquids through said faucet, is the bottom 5, preferably conical in form and terminating at its apex or central point in a distributing point or elbow 6, having the supply-pipes 7, each communicating into and leading therefrom and each terminating in the faucet portion 8, which extends or projects on the outside of the base of the receptacle and is formed with a spout 9, as more clearly shown in Fig. 3.

Figure 5:
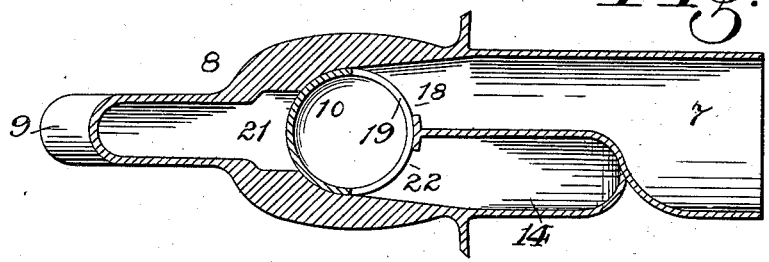
Figure 6:
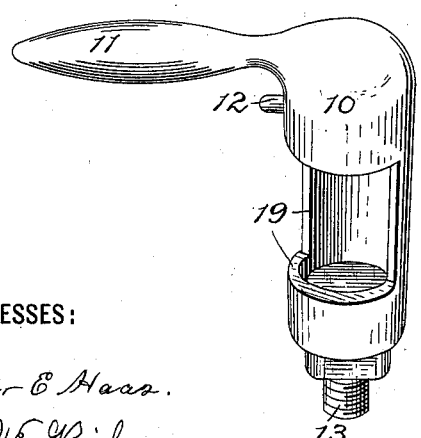

Passing through the central opening in the body of the faucet is the key 10, provided with a handle 11, formed with a pin or stop 12, so as to assume the positions shown in Figs. 4 and 5, said key being retained in position in the opening in the body of said faucet by a washer and nut, which engages its screw-threaded stem 13 in the ordinary and well-known manner. As shown, the key or turning-plug 10 is formed tubular, having one of its sides cut away to form a single port. This construction is of especial advantage in that the passage-way through the plug is not contracted relatively to that of the connections which lead to and from said port. Furthermore, the walls of the passage-way within the plug being rounded to conform to the outer periphery of the plug there are no abutments or their equivalents which would tend to form a back pressure against the free passage of the liquid therethrough, and this especially true where, as in the present case, the passage-way leads from one storage-chamber to another, the weight of the liquid which has passed through the turning-plug from the larger receptacle to the smaller forming in itself an element tending to back pressure, so that were the passage-way through the plug a flat-sided one the back pressure ensuing from the contact of the liquid against the flat side would prevent the free passage of the liquid from one vessel to another, especially when used in connection with a heavy liquid, such as molasses, &c. Each faucet 8 is also formed with a small elbow 14, which terminates inside of the measure 15, just above it.

In Fig. 2 I have shown my automatic measuring device as provided with three of the measures 15, having a capacity of one gallon, one-half gallon, and one-fourth gallon; but it is obvious that any number of measures each having a capacity for a sufficient number of quarts, as desired, may be used, as above referred to, said measures each being connected to and made integral with the bottom 5 and provided with a vent-tube 16, suitably held in position, as at 17. Each of said tubes may, if desired, be provided at its top with a small whistle 20, which as the oil or other liquids pass from the supply receptacle or reservoir through the distributing point or elbow 6, thence through supply-pipe 7, thence through port 18, thence through port 19 in key 10, (when said key is in a position to close the opening or port 21 leading into spout 9, as shown in Fig. 5,) and thence through port 22 and through small elbow 14 into measure 5, and as said oil or other liquid rises in said measure the air will be expelled therefrom and forced up said vent-tube and while said measure is filling will give a shrill signal as it passes out through the whistle, and the air as it thus escapes into said supply-reservoir will permit of the free and uninterrupted flow of the oil, as heretofore described, and by turning key 10 by means of its handle 11 to the position shown in Figs. 1, 3, and 4 port 18, which leads from the faucet into supply-pipe 7, all communication therefrom will be closed, thus cutting off the oil or liquid from said supply-receptacle, while at the same time the port 22, leading from elbow 14, will be opened and also port 21 of spout 9, thus permitting the contents to be drawn off in any vessel which may be placed under the spout.

The nature and operation of my invention having now been sufficiently described to be readily understood,

What I claim is—

1. In an automatic measuring device, a receptacle having an inlet normally sealed, said receptacle having a funnel-shaped bottom, a distributing-elbow located at the lowermost portion of the bottom and constituting the sole outlet from said receptacle; a plurality of measures having different capacities, located below said receptacle and each having a vent-outlet within the receptacle; an independent connection between each of said measures and said elbow, said connections being entirely below the measures; a faucet-outlet leading from each of said connections; and a tubular turning plug, having one of its sides cut away to form a single port, located in each of said connections, the passage-way through said plug being unrestricted, said plug having a movement to open and close the passage-way from said elbow to the measure and open a passage-way from the measure to the faucet-outlet, and also prevent a passage-way from the elbow to the faucet-outlet, substantially as described.

2. In an automatic measuring device, a receptacle; a measure located below the bottom thereof; a connection between the receptacle and the measure, said connection being located below the said measure, said connection comprising a faucet carrying a tubular turning plug having an open side forming a single port; a pipe leading from said receptacle to said plug; a pipe leading from the plug to the measure and having its plug end located in juxtaposition to and in the same horizontal plane with said receptacle-pipe; and a faucet-outlet having its plug end located in the same horizontal plane with the plug ends of said receptacle and measure pipes, substantially as described.

In testimony whereof I have affixed my signature in presence of two witnesses.

ALVA SYLVESTER COLLINS.

Witnesses:
E. W. DYSERT,
A. L. HARSHMAN.